US012024691B2

(12) United States Patent
Kang et al.

(10) Patent No.: US 12,024,691 B2
(45) Date of Patent: Jul. 2, 2024

(54) FABRIC CARE COMPOSITION COMPRISING HYDROPHOBICALLY MODIFIED POLYALKYLENEIMINE AS DYE FIXATIVE POLYMER

(71) Applicant: BASF SE, Ludwigshafen am Rhein (DE)

(72) Inventors: Yan Kang, Shanghai (CN); Ya Jing Liu, Shanghai (CN); Yungi Lee, Tokyo (JP); Helmut Witteler, Ludwigshafen (DE); Alexandros Lamprou, Shanghai (CN)

(73) Assignee: BASF SE, Ludwigshafen am Rhein (DE)

( * ) Notice: Subject to any disclaimer, the term of this patent is extended or adjusted under 35 U.S.C. 154(b) by 594 days.

(21) Appl. No.: 17/273,991

(22) PCT Filed: Aug. 30, 2019

(86) PCT No.: PCT/EP2019/073252
§ 371 (c)(1),
(2) Date: Mar. 5, 2021

(87) PCT Pub. No.: WO2020/053001
PCT Pub. Date: Mar. 19, 2020

(65) Prior Publication Data

US 2022/0372404 A1 Nov. 24, 2022

(30) Foreign Application Priority Data

Sep. 11, 2018 (WO) ................ PCT/CN2018/105106

(51) Int. Cl.

| | |
|---|---|
| ***C11D 1/00*** | (2006.01) |
| ***B08B 3/04*** | (2006.01) |
| ***C11D 1/04*** | (2006.01) |
| ***C11D 1/46*** | (2006.01) |
| ***C11D 1/94*** | (2006.01) |
| ***C11D 3/20*** | (2006.01) |
| ***C11D 3/37*** | (2006.01) |
| ***C11D 3/39*** | (2006.01) |

(52) U.S. Cl.
CPC .............. *C11D 3/3723* (2013.01); *C11D 1/04* (2013.01); *C11D 1/46* (2013.01); *C11D 1/94* (2013.01); *C11D 3/2072* (2013.01); *C11D 3/3925* (2013.01); *C11D 2111/12* (2024.01)

(58) Field of Classification Search
CPC ....... C11D 1/00; C11D 3/3723; C11D 3/3769; B08B 3/04
See application file for complete search history.

(56) References Cited

U.S. PATENT DOCUMENTS

| | | | |
|---|---|---|---|
| 3,936,537 A | 2/1976 | Baskerville, Jr. et al. | |
| 6,235,704 B1 | 5/2001 | Detering et al. | |
| 6,271,901 B1 | 8/2001 | Ide et al. | |
| 2004/0139559 A1 | 7/2004 | Detering et al. | |
| 2007/0277327 A1 | 12/2007 | Wessling et al. | |
| 2010/0017973 A1 | 1/2010 | Detering et al. | |
| 2013/0161239 A1* | 6/2013 | Gane ........................ | B03D 1/12 209/166 |

FOREIGN PATENT DOCUMENTS

| | | |
|---|---|---|
| WO | 9904313 A1 | 1/1999 |
| WO | 9906524 A1 | 2/1999 |
| WO | 02095122 A1 | 11/2002 |

OTHER PUBLICATIONS

International Search Report and Written Opinion for corresponding PCT/EP2019/073252 dated Nov. 20, 2019, 11 pages.
"Liquid Detergents", ed. Kuo-Yann Lai, Surfactant Science Series, 1st Edition, vol. 67, 1996, pp. 272-304.

* cited by examiner

*Primary Examiner* — Brian P Mruk
(74) *Attorney, Agent, or Firm* — Armstrong Teasdale LLP

(57) ABSTRACT

Described herein is a fabric care composition including at least one hydrophobically modified polyalkyleneimine as dye fixative polymer. Also described herein is a method for providing an improved color care effect during washing or treatment of colored fabric, the method including use of the hydrophobically modified polyalkyleneimine as dye fixative polymer.

18 Claims, No Drawings

FABRIC CARE COMPOSITION COMPRISING HYDROPHOBICALLY MODIFIED POLYALKYLENEIMINE AS DYE FIXATIVE POLYMER

CROSS-REFERENCE TO RELATED APPLICATIONS

This application is a U.S. National Phase Application of International Patent Application No. PCT/EP2019/073252, filed Aug. 30, 2019, which claims the benefit of priority to International Patent Application No. PCT/CN2018/105106, filed Sep. 11, 2018, the entire contents of which are hereby incorporated by reference herein.

TECHNICAL FIELD

The invention relates to a hydrophobically modified polyalkyleneimine as dye fixative polymer in fabric care formulation. The present invention also relates to a method for color fixing effect when washing colored fabric by using the dye fixative polymer.

BACKGROUND ART

A known problem in the washing and/or treatment of colored fabrics is color fading in the fabric appearance, which is at least partly due to loss of color shade intensity, fidelity and color definition. Such a problem of color loss is even more acute in laundry treatment after several washing cycles, especially for dark colors, such as blacks, reds, blues and greens.

During the washing process, when the colors of a colored fabric are poorly fixed, i.e. color bleeding, not just rapid fading of the colored fabrics takes place, but there can also, as a result of the relatively high dye concentrations in the wash liquor, additionally be staining of differently colored or white fabrics washed at the same time.

To solve the problem of color bleeding and color fading, several mechanisms have been speculated upon for color loss and various means have been proposed to prevent or reduce the extent of the loss or transfer of color. Dye fixative agent and dye transfer inhibitor are well-known which are designed to improve the appearance of colored fabrics by minimizing the loss and transfer of dyes from fabrics due to washing or treatment. U.S. Patent No. 2010/0017973 discloses a dye transfer inhibitor which may prevent color transferring during laundry processes. However, color bleeding and fading of colored fabric cannot be prevented. U.S Patent No. 2007/0277327 discloses a detergent and cleaning agents containing polyamines/polyimines or their derivatives as dye fixative agents, which can be used in combination with soil release polymers. However, the use of most dye fixative agents in liquid laundry detergent formulation is in practice restricted to the formulations which do not comprise any anionic surfactants or comprise very low content of anionic surfactants, due to the lack of compatibility of the anionic surfactants with the dye fixative compounds, which causes flocculation, precipitation or phase separation of the compounds.

In recent times there is still an increasing demand for laundry formulations comprising dye fixative agent which may improve the color fastness and show excellent compatibility with detersive surfactants.

It is thus the object of the present invention to provide a dye fixative polymer which will help effectively fix dyes through laundry washing and/or treatment processes, while showing better and broader compatibility with laundry formulations.

SUMMARY OF INVENTION

In one aspect, the present invention is directed to a fabric care composition comprising at least one hydrophobically modified polyalkyleneimine, wherein the hydrophobically modified polyalkyleneimine comprises a polyalkyleneimine backbone having a weight-average molecular weight greater than or equal to 200 g/mol and less than 1000 g/mol, and hydrophobic moieties which are covalently attached to the backbone of polyalkyleneimine.

Preferably, the unmodified polyalkyleneimine backbone can be polyethyleneimine, polypropyleneimine or polybutyleneimine. Preferably said unmodified polyalkyleneimine has a weight-average molecular weight greater than or equal to 300 g/mol and less than 1000 g/mol, more preferably greater than or equal to 500 g/mol and less than 1000 g/mol.

In a further aspect, the hydrophobically modified polyalkyleneimines are obtained by a process which comprises the reaction of an unmodified polyalkyleneimine with a hydrophobicizing agent.

In still a further aspect, the present invention provides a fabric care composition comprising the hydrophobically modified polyalkyleneimine and at least one nonionic, anionic and/or cationic surfactant.

In another aspect, the present invention provides a method for providing an improved color care effect during washing and/or treating of colored fabrics, which comprises a step of contacting the colored fabrics with a washing solution which contains the hydrophobically modified polyalkyleneimine.

In still another aspect, the present invention relates to use of the fabric care composition comprising the hydrophobically modified polyalkyleneimine for enhancing color care effect during washing and/or treatment of colored fabrics.

Surprisingly and unexpectedly, the application has now discovered that the hydrophobically modified polyalkyleneimine of the present invention, when being formulated in fabric care composition, exhibits satisfactory color fixing effect and excellent compatibility, and thus makes it possible to achieve the objective as outlined above.

DESCRIPTION

Throughout the description, including the claims, the term “comprising one” or “comprising a” should be understood as being synonymous with the term “comprising at least one”, unless otherwise specified, and “between” should be understood as being inclusive of the limits.

The terms “a”, “an” and “the” are used to refer to one or to more than one (i.e., to at least one) of the grammatical object of the article.

The term “and/or” includes the meanings “and”, “or” and also all the other possible combinations of the elements connected to this term.

It should be noted that in specifying any range of concentration, weight ratio or amount, any particular upper concentration, weight ratio or amount can be associated with any particular lower concentration, weight ratio or amount, respectively.

As used herein, the term “fabric care” is the broadest term which refers to the present composition which improves the appearance or wear properties of fabric, especially clothing. For the purposes of the present invention fabric care compositions are divided into several categories, inter alia, laundry detergent compositions, fabric appearance, each of which are typically characterized by the presence of an ingredient or the lack thereof. For example, “laundry detergent compositions” are required to comprise one or more detersive surfactants while “fabric softener composition” are required to comprise one or more cationic quaternary ammonium compounds. The term “fabric care” may refer to the laundry detergent compositions as well as the fabric conditioning compositions.

As used herein, the term “hydrophobically modified polyalkyleneimine” refers to polyalkyleneimine with hydrophobic groups chemically attached to unmodified polyalkyleneimine backbone.

As used herein, the term “unmodified or non-modified” refers to a polymer substrate that is not modified or functionalized.

As used herein, the term “hydrocarbon radical” refers to any straight, branched, cyclic, acyclic, heterocyclic, saturated or unsaturated chain, which contains a carbon backbone comprising one or more hydrogen atoms, optionally substituted with one or more heteroatoms in or on the carbon backbone.

As used herein, the term “hydrophobic moiety” is a moiety which can be saturated or unsaturated, substituted or unsubstituted, straight or branched, cyclic or acyclic hydrocarbon group.

As used herein, the term “alkyl” means a saturated hydrocarbon radical, which may be straight, branched or cyclic, such as, for example, methyl, ethyl, n-propyl, isopropyl, n-butyl, sec-butyl, t-butyl, pentyl, n-hexyl, cyclohexyl.

As used herein, the term “hydroxyalkyl” means an alkyl radical, more typically an alkyl radical, that is substituted with a hydroxyl groups, such as for example, hydroxymethyl, hydroxyethyl, hydroxypropyl, and hydroxydecyl.

As used herein, the term “alkylene” means a bivalent acyclic saturated hydrocarbon radical, including but not limited to methylene, polymethylene, and alkyl substituted polymethylene radicals, such as, for example, dimethylene, tetramethylene, and 2-methyltrimethylene.

As used herein, the term “alkenyl” and “alkadienyl” refer to alkyl groups having, respectively, one or two carbon-carbon double bonds within the chain.

As used herein, the term “alkenylcarbonyl” refer s to a group —C(═O)R, wherein R is alkenyl which can be optionally substituted.

The present invention is directed to a fabric care composition comprising at least one hydrophobically modified polyalkyleneimine, wherein the hydrophobically modified polyalkyleneimine comprises a polyalkyleneimine backbone having a weight-average molecular weight greater than or equal to 200 g/mol and less than 1000 g/mol, preferably greater than or equal to 300 g/mol and less than 1000 g/mol, more preferably greater than or equal to 500 g/mol and less than 1000 g/mol; and hydrophobic moieties which are covalently attached to the backbone of polyalkyleneimine.

The hydrophobically modified polyalkyleneimines are to be understood as meaning polyalkyleneimines in which the hydrogen atoms of the primary and secondary amino groups are partially or completely replaced by linear or branched aliphatic, saturated or unsaturated hydrocarbon radicals such as alkyl, alkenyl, alkadienyl or hydroxyalkyl radicals. The hydrocarbon radicals generally have 4 to 30 carbon atoms, preferably 6 to 18 carbon atoms, more preferably 8 to 16 carbon atoms.

The hydrophobically modified polyalkyleneimines can be obtained by a process which comprises the reaction of an unmodified polyalkyleneimine with a hydrophobicizing agent. Depending on the hydrophobicizing agent used in each case, the hydrocarbon radicals can be linked to the nitrogen atom of the polyalkyleneimine directly or via a functional group, e.g. via a carbonyl group (*—C(═O)—#), via an oxycarbonyl group (*—O—C(═O)—#), via an aminocarbonyl group (*—NH—C(═O)—#), via a carbonyloxyhydroxylpropyl group (*—C(═O)—O—$CH_2$—CH(OH)—$CH_2$—#), via a 2-oxycarbonylethylenecarbonyl group (*—CH(COOH)—$CH_2$—CO—#), or via a radical of the formula *—$CH_2$—(C═O)—CH—(C═O)—# (in the formulae given above. *represents the linkage to the hydrocarbon radical and # represents the linkage to the nitrogen atom of the polyalkyleneimine). The hydrocarbon radical can also form an aldimine or ketimine group with the nitro-gen of the polyalkyleneimine or be linked to 2 nitrogen atoms of the polyalkyleneimine via the carbon atom of a cyclic amidine group.

Preferably, the hydrophobically modified polyalkyleneimine has the hydrocarbon radical which is linked to one nitrogen atom of the polyalkyleneimine directly or via a carbony) group. The latter being particularly preferred. Preferably, the hydrocarbon radicals are linear, more preferably, the hydrocarbon radicals are saturated.

According to any one of the invention embodiments, the hydrocarbon radicals in the preferred hydrophobically modified polyalkyleneimines are present in the form of $C_4$-$C_{30}$-alkyl, $C_4$-$C_{30}$-alkylcarbonyl, $C_4$-$C_{30}$-alkenyl, $C_4$-$C_{30}$-alkenylcarbonyl, $C_4$-$C_{30}$-alkadieny, $C_4$-$C_{30}$-alkadienylcarbonyl and/or hydroxy-$C_4$-$C_{30}$-alkyl groups, in particular in the form of $C_6$-$C_{18}$-alkyl, $C_6$-$C_{18}$-alkylcarbonyl, $C_6$-$C_{18}$-alkenyl, $C_6C_{18}$-alkenylcarbonyl, $C_6$-$C_{18}$-alkadienyl, $C_6$-$C_{18}$-alkadienylcarbonyl and/or hydroxy-$C_6$-$C_{18}$-alkyl groups, particularly preferably in the form of $C_8$-$C_{16}$-alkyl, $C_8$-$C_{16}$-alkylcarbonyl, $C_8$-$C_{16}$-alkenyl, $C_8$-$C_{16}$-alkenylcarbonyl, $C_8$-$C_{16}$-alkadienyl, $C_8$-$C_{16}$-alkadienylcarbonyl and/or hydroxy-$C_8$-$C_{16}$-alkyl groups, where the alkyl, hydroxyalkyl, alkenyl, alkadienyl radicals of the aforementioned groups are preferably linear.

In some preferred embodiment, the hydrocarbon radicals are present in the form of $C_4$-$C_{30}$-alkylcarbonyl or $C_4$-$C_{30}$-alkenylcarbonyl group, particularly in the form of $C_6$-$C_{18}$-alkylcarbonyl or $C_6$-$C_{18}$-alkenylcarbonyl group, more particularly, in the form of $C_8$-$C_{16}$-alkylcarbonyl or $C_8$-$C_{16}$-alkenylcarbonyl group, where the alkyl and alkenyl radicals of the aforementioned groups are preferably linear.

According to any one of the invention embodiments, about from 2 to 25 mol %, in particular 5 to 20 mol %, in more particular from 6 to 15 mol % of the nitrogen atoms of the hydrophobically modified polyalkyleneimine carry a hydrocarbon radical. Correspondingly, the fraction of the hydrocarbon radicals constitutes preferably 5 to 60% by weight, in particular 10 to 50% by weight and specifically 10 to 35% by weight, based on the total weight of the hydrophobically modified polyalkyleneimine.

The hydrophobically modified polyalkyleneimine used according to the present invention can be linear or branched. In particular, the branched polyalkyleneimine branching may occur at its nitrogen fractions. The linear polyalkyleneimines are composed exclusively of repeat units of formula A; the branched polyalkyleneimines have, besides the linear repeat units, tertiary nitrogen atoms according to the formula B:

A

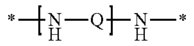

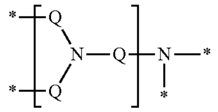

B

In which Q is $C_2$-$C_8$ alkylene, preferably is ethylene, propylene or butylene.

Preference is given to those branched, hydrophobically modified polyalkyleneimines, in particular branched, hydrophobically modified polyethyleneimines, which, based on the polyalkyleneimine on which they are based, have, on average, per polyalkyleneimine molecule at least one, preferably at least 5 or at least 10, branching points according to formula B. In particular, at least 5%, in particular at least 10% and particularly preferably at least 15%, e.g. 5 to 40% and specifically 15 to 35%, of the nitrogen atoms of the parent polyalkyleneimine are tertiary nitrogen atoms. Particularly, in the case of high degrees of branching, i.e. if at least 10%, in particular 15%, e.g. 10 to 40%, in particular 15 to 35% of the nitrogen atoms of the parent polyalkylimine are tertiary nitrogen atoms, the hydrophobically modified polyalkyleneimines have a structure similar to a core-shell structure, where the polyalkyleneimine moieties form the core and the hydrophobic radicals form the shell.

According to any one of the invention embodiments, the hydrophobically modified polyalkyleneimines can be present in uncrosslinked or crosslinked form. Preferably, the hydrophobically modified polyalkyleneimines are uncrosslinked. According to any one of the invention embodiments, the hydrophobically modified polyalkyleneimine has a weight-average molecular weight in the range of from 300 g/mol to 5000 g/mol, preferably from 500 to 3000 g/mol, more preferably from 800 g/mol to 2000 g/mol.

The hydrophobically modified polyalkyleneimines which are used according to the invention are in part known from the prior art or can be prepared analogously to the methods described hereinafter. Accordingly, one embodiment of the present invention relates to the use of a hydrophobically modified polyalkyleneimine obtainably by a process which comprises the reaction of an unmodified polyalkyleneimine, in particular, an unmodified branched polyalkyleneimine, and specifically an unmodified branched polyethyleneimine, with a hydrophobicizing agent.

Examples of suitable hydrophobicizing agents include but not limit to:

i) long chain, linear or branched carboxylic acids having 4 to 30 carbon atoms, preferably 6 to 18 carbon atoms, more preferably 8 to 16 carbon atoms, in the alkyl or alkenyl radical, such as caprylic acid, pelargonic acid, undecanoic acid, lauric acid, tridecanoic acid, myristic acid, pentadecanoic acid, palmitic acid, margaric acid, stearic acid, nonadecanoic acid, arachic acid, behenic acid, palmitoleic acid, oleic acid, linoleic acid, linolenic acid, arachidonic acid and mixtures thereof, preferably lauric acid, stearic acid, palmitic acid and oleic acid, or their amide-forming derivatives, such as acid chlorides, esters or anhydrides of the specified carboxylic acids and mixtures thereof;

ii) natural oils, including plant oils, nut oils, seed oils, animal oils and marine oils, which typically contain triglycerides, free fatty acids, or a combination of triglycerides and free fatty acids. Example of suitable natural plant oils are soybean oil, rapeseed oil, palm oil, corn oil, cottonseed oil, coconut oil, palm kernel oil; Example of suitable animal/marine oils are lard, fish oil, beef tallow oil, seal oil and milk fat, and those obtained by hydrogenation or ester-exchange of these oil, and mixture thereof;

iii) linear or branched alkyl halides having 4 to 30 carbon atoms, preferably 6 to 18 carbon atoms, more preferably 8 to 16 carbon atoms, in the linear or branched alkyl radical such as octyl chloride, nonyl chloride, decyl chloride, dodecyl chloride, tetradecyl chloride, hexadecyl chloride, octadecyl chloride and mixtures thereof;

iv) alkyl epoxides having 4 to 30 carbon atoms, preferably 6 to 18 carbon atoms, more preferably 8 to 16 carbon atoms in the linear or branched alkyl radical, such as hexadecenyl oxide, dodecenyl oxide and octadecenyl oxide and mixtures thereof;

v) alkyl ketene dimers having 4 to 30 carbon atoms, preferably 6 to 18 carbon atoms, in particular 8 to 16 carbon atoms in the linear or branched alkyl radical, such as lauryl ketene, palmityl ketene, stearyl ketene and oleyl ketene dimers and mixtures thereof;

vi) cyclic dicarboxylic acid anhydrides, in particular alkyl-substituted succinic anhydrides having 4 to 30 carbon atoms, preferably 6 to 18 carbon atoms, in particular 8 to 16 carbon atoms, in the linear or branched alkyl radical, such as dodecenylsuccinic anhydride, tetradecylsuccinic anhydride, hexadecenylsuccinic anhydride and mixtures thereof;

vii) alkyl isocyanates having 4 to 30 carbon atoms, preferably 6 to 18 carbon atoms, more preferably 8 to 16 carbon atoms in the linear or branched alkyl radical, such as tetradecyl isocyanate, hexadecyl isocyanate, octadecyl isocyanate and mixtures thereof;

viii) chloroformic acid esters of linear or branched alkanols or alkenols having 4 to 30 carbon atoms, preferably 6 to 18 carbon atoms, more preferably 8 to 16 carbon atoms, and dialkyl ketones having in total 4 to 30 carbon atoms, in particular 6 to 18 carbon atoms and mixtures thereof.

viiii) linear or branched aliphatic aldehydes having 4 to 30 carbon atoms, preferably 6 to 18 carbon atoms, in particular 8 to 16 carbon atoms, and dialkyl ketones having in total 4 to 30 carbon atoms, preferably 6 to 18 carbon atoms, in particular 8 to 16 carbon atoms, in the two alkyl groups and mixtures thereof.

According to any one of the invention embodiments, the unmodified polyalkyleneimines which form the basis of the hydrophobically modified polyalkyleneimines comprise homopolymers of ethyleneimine (aziridine) and higher homologs thereof, propyleneimine (methylaziridine) and butyleneimine (1,2-dimethylaziridine, 1,1-dimethylaziridine and 1-ethylaziridine), copolymers of ethyleneimine with its higher homologs, and the graft polymers of polyamidoamines or polyvinylamines with ethyleneimine and/or its higher homologs. Also suitable are the graft polymers of alkyleneimines described in WO02/095122, such as ethyleneimine onto polyamidoamines or onto polyvinylamines. Such graft polymers generally have a weight fraction of alkyleneimines of at least 10% by weight, in particular at least 30% by weight, e.g. 10 to 90% by weight in particular 10 to 85% by weight, based on the total weight of the unmodified polyalkyleneimne. In some preferred embodiments, the unmodified polyalkyleneimines are branched polyalkyleneimines, preferably polyethyleneimines, in particular branched polyethyleneimines, in more particular homopolymers of ethylene-imines, in still more particular branched homopolymers of ethyleneimines.

According to any one of the invention embodiments, the unmodified polyalkyleneimine has a weight-average molecular weight $M_w$ of from greater than or equal to 200 g/mol to less than 1000 g/mol. Preferably, the unmodified polyalkyleneimine has a weightaverage molecular weight $M_w$ of from greater than or equal to 300 g/mol to less than 1000 g/mol. More preferably, the unmodified polyalkyleneimine has a weight-average molecular weight $M_w$ of from greater than or equal to 500 g/mol to less than 1000 g/mol. The molecular weights given here refer to the molecular weights specified by means of gel permeation chromatography and measured on dilute aqueous solutions at 25° C., which correspond to the weight-average molecular weight.

The present invention also relates to the reaction of the unmodified polyalkyleneimine with at least one hydrophobicizing agent, which can take place according to the processes known in the prior art. The reaction conditions naturally depend on the type and functionality of the polyalkyleneimine and the hydrophobicizing agents. In some embodiments, the reaction may be performed with or without a solvent or diluent. Examples of suitable solvents for the reaction include but not limit to hydrocarbons, in particular aromatic hydrocarbons, e.g. alkylbenzenes such as xylenes, toluene, cumene, tert-butylbenzene and the like. In some embodiments, the reaction may take place as a solvent-free reaction, which at least comprises (a) heating the mixture of polyalkyleneimine and hydrophobicizing agent to melt state; (b) stirring the mixture and reacting the polyalkyleneimine with an amount of hydrophobicizing agent, wherein the amount of the hydrophobicizing agent used is sufficient to derivatize about 2 mol % to 25 mol %, in particular about 5 to 20 mol %, in more particular 6 to 15 mol % of the nitrogen atoms of the polyalkyleneimine. In some preferred embodiment, the reaction taking place between the unmodified polyalkyleneimine and natural oils as the hydrophobicizing agent, comprises (a) heating the mixture of polyalkyleneimine and natural oil to melt state; (b) stirring the mixture and reacting the polyalkyleneimine under nitrogen flow with an amount of natural oil at a temperature of 80 to 120° C., wherein the amount of the hydrophobicizing agent used is sufficient to derivatize about 2 mol % to 25 mol %, in particular about 5 to 20 mol %, in more particular 6 to 15 mol % of the nitrogen atoms of the polyalkyleneimine. In some embodiments, the hydrophobicizing agent will be used in an amount which corresponds to the desired functionality, it also being possible to use the hydrophobicizing agent in excess.

In some embodiments, the reaction may be also performed in the presence of catalysts which improve the reactivity of the hydrophobicizing agent toward the polyalkyleneimine. The type of catalyst depends in a manner known per se on the type and reactivity of the hydrophobicizing agent. The catalysts are usually Lewis acids or Bronsted acids.

In some embodiments, the carboxylic acids and carboxylic acid derivatives are used as the hydrophobicizing agent, it has proven advantageous to remove the low molecular weight products, such as water, alcohols or hydrogen chloride which form during the reaction from the reaction mixture. For example, when using carboxylic acids, the water formed will preferably be removed from the reaction mixture via an entrainer or vacuum. Typical entrainers are hydrocarbons, in particular alkyl aromatics such as toluene or xylenes.

The hydrophobically modified polyalkyleneimine are generally water-soluble or water-dispersible and can be used in solid and/or liquid fabric care compositions. Said fabric care compositions comprising the hydrophobically modified polyalkyleneimine, can be used for various fabric care products which include but not limit to laundry detergents, after rinse conditioners, pretreatment agents, tumble drier sheet, after-washing sprays etc.

The hydrophobically modified polyalkyleneimines of the present invention are characterized in particular by high compatibility with conventional detergent ingredients, in particular with the ingredients of liquid detergent formulation, which comprises anionic surfactant, non-ionic surfactant and optionally a cationic surfactant. The solid/liquid fabric care compositions, which comprise the hydrophobically modified polyalkyleneimine, can be prepared by a method known in the prior art, in which the hydrophobically modified polyalkyleneimine may be used in powder or granule form or in liquid form, preferably being used in liquid form, i.e. dissolved or dispersed form.

In some embodiments, the hydrophobically modified polyalkyleneimines can be used, for example, in those detergent formulations which comprise a detersive surfactant system containing predominantly nonionic surfactants. Preferably the concentration of nonionic surfactants, based on the total amount of surfactants in the fabric care composition, is from 10% to 100% by weight, preferably from 20% to 100% by weight, more preferably from 30% to 100% by weight. In still some embodiments, the hydrophobically modified polyalkyleneimines come in useful especially in those detergent formulations which may comprise relative high content of anionic surfactants in the detersive surfactant system. Preferably, the concentration of anionic surfactants, based on the total amount of surfactant in the fabric care composition, is from 10 to 100% by weight, preferably from 20% to 100% by weight, more preferably from 30 to 100% by weight.

The solid composition further comprises at least one nonionic, cationic and/or anionic surfactant. The overall concentration of the surfactants in the compositions can be from 0.5% to 60% and preferably 5 to 40% by weight. A typical amount of the hydrophobically modified polyalkyleneimine to be employed in the composition of the invention is from 0.01% to 30% by weight, preferably 0.01% to 15% by weight, more preferably 0.05% to 5% by weight of the composition.

The liquid composition further comprises at least one nonionic, anionic and/or cationic surfactant. The overall concentration of the surfactants in the composition can be from 0.5% to 80% and preferably 5 to 70% by weight. A typical amount of the hydrophobically modified polyalkyleneimine to be employed in the composition of the invention is from 0.01% to 30% by weight, preferably 0.01% to 15% by weight, more preferably 0.05% to 5% by weight of the formulation.

Depending on their intended use, the composition is adapted to the type of textiles to be washed/treated.

The surfactants used may be anionic, nonionic, amphoteric and cationic. It is also possible to use mixtures of said surfactants, Preferred laundry detergent formulations comprise anionic and/or nonionic surfactants and mixtures thereof with other surfactants.

Suitable anionic surfactants are sulfates, sulfonates, carboxylates, phosphates and mixture thereof. Suitable cations here are alkali metals, such as, for example, sodium or potassium or alkaline earth metals, such as, for example, calcium or magnesium, and ammonium, substituted ammonium compounds, including mono-, di- or triethanolammonium cations, and mixtures thereof.

The following types of anionic surfactants are particularly preferred:

Sulfates of (fatty) alcohols having 8 to 22, preferably 10 to 18, carbon atoms, in particular $C_9$-$C_{11}$-alcohol sulfates, $C_{12}$-$C_{14}$-alcohol sulfates, $C_{12}$-$C_{18}$-alcohol sulfates, lauryl sulfate, cetyl sulfate, myristyl sulfate, palmityl sulfate, stearyl sulfate and tallow fatty alcohol sulfate; Sulfated alkoxylated $C_8$-$C_{22}$-alcohol (alkyl ether sulfates): compounds of this type are prepared, for example, by firstly alkoxylating a $C_8$-$C_{22}$-, preferably a $C_{10}$-$C_{18}$-alcohol, e.g. a fatty alcohol, and then sulfating the alkoxylation product. For the alkoxylation, ethylene oxide is preferably used; linear $C_8$-$C_{20}$ alkylbenzenesulfonates (LAS), preferably linear $C_9$-$C_{13}$-alkylbenzenesulfonates and alkyltoluenesulfonates; alkanesulfonates, in particular $C_8$-$C_{24}$-, preferably $C_{10}$-$C_{18}$-alkanesulfonates; olefinsulfonates; fatty acid and fatty acid ester sulfonates; soaps, such as the Na and K salts of $C_8$-$C_{24}$-carboxylic acids, and mixtures thereof.

The anionic surfactants are preferably added to the laundry formulation in the form of salts. Suitable salts here are, for example, alkali metal salts, such as sodium, potassium and lithium salts, and ammonium salts, such as hydroxyethylammonium, di(hydroxyethyl)ammonium and tri(hydroxyethyl)ammonium salts.

Examples of suitable nonionic surfactants are the following compounds:

Alkoxylated $C_8$-$C_{22}$-alcohols, such as fatty alcohol alkoxylates, oxo alcohol alkoxylates and Guerbet alcohol ethyoxylates, the alkoxylation can take place with ethylene oxide, propylene oxide and/or butylene oxide. Block copolymers of random copolymers may be present. Per mole of alcohol, they usually comprise 2 to 50 mol, preferably 3 to 20 mol, of at least one alkylene oxide. A preferred alkylene oxide is ethylene oxide. The alcohols preferably have 10 to 18 carbon atoms; alkylphenol alkoxylates, in particular alkylphenol ethoxylates, which comprise $C_6$-$C_{14}$-alkyl chains and 5 to 30 mol of alkylene oxide; alkyl polyglucosides which comprise $C_8$-$C_{22}$-, preferably $C_{10}$-$C_{18}$-alkyl chains and as a rule 1 to 20, preferably 1.1 to 5, glucoside units; N-alkylglucamides, fatty acid amide alkoxylates, fatty acid alkanolamide alkoxylates, long-chain amine oxides, polyhydroxy(alkoxy) fatty acid amides, gemini surfactants, and block copolymers of ethylene oxide, propylene oxide and/or butylene oxide; and their mixtures.

Examples of suitable cationic surfactants are the following compounds:

Substituted or unsubstituted, straight-chain or branched, quaternary ammonium salts of the $R_1N(CH_3)_3^+X^-$, $R_1R_2N(CH_3)^+X^-$, $R_1R_2R_3N(CH_3)^+X^-$ or $R_1R_2R_3R_4N^+X^-$ type. The $R_1$, $R_2$, $R_3$ and $R_4$ radicals are each independently preferably unsubstituted alkyl having a chain length of from 8 to 24 carbon atoms, in particular from 10 to 18 carbon atoms, hydroxy-alkyl having from about 1 to 4 carbon atoms, phenyl, $C_2$-$C_{18}$-alkeyl, $C_7$-$C_{24}$-aralkyl, $(C_2H_4O)_xH$ where x is an integer from 1 to 3, alkyl radials comprising one or more ester groups, or cyclic quaternay ammonium salts. X is a suitable anion.

Further preferred cationic surfactants can be $C_7$-$C_{25}$-alkylamines; N,N-dimethyl-N-(hydroxy-$C_7$-$C_{25}$-alkyl)ammonium salts; mono- and di($C_7$-$C_{25}$-alkyl)dimethylammonium compounds quaternized with alkylating agents; ester quaternary ammonium salts, in particular quaternary esterified mono-, di-and trialkanolamines which have been esterified with $C_8$-$C_{22}$-carboxylic acids; imidazoline quaternary ammonium and its derivatives.

Typical examples of amphoteric or zwitterionic surfactants are alkylbetaines, alkylamidobetaines, aminopropionates, aminoglycinates or amphoteric imidazolinium compounds. Preferred amphoteric surfactants thereof are cocoamphocarboxypropionate, cocoamidocarboxylpropionic acid, cocoamphocarboxyglycinate (also referred to as cocoamphodiacetate) and cocoamphoacetate. Further preferred amphoteric surfactants are alkyldimethylbetaines and alkyldipolyethoxybetaines with an alkyl radical having about 8 to about 22 carbon atoms, which may be linear or branched, preferably having about 12 to about 18 carbon atoms.

Further laundry ingredients which may be used in the present invention include inorganic and/or organic builders in order to reduce the degree of hardness of the water.

These builders may be present in the fabric care formulations in proportions by weight of from about 5% to about 80%. Inorganic builders include, for example, alkali metal, ammonium and alkanolammonium salts of polyphosphates, pyrophosphates and glasslike polymeric metaphosphates, phosphonates, silicates, carbonates including bicarbonates and sesquicarbonates, sulfates and alumosilicates. Examples of alumosilicate builders are crystalline and amorphous alumosilicates with ion-exchanging properties, such as in particular zeolites, various types of zeolites are suitable , in particular the zoelites A, X, B, P, MAP and HS in their Na form or in forms in which Na is partially replaced by other cations such as Li, K, Ca, Mg or ammonium; Examples of silicate builders are the alkali metal silicates, in particular those with an $SiO_2$:$Na_2O$ ratio between 1.6:1 and 3.2:1, and phyllosilicates, amorphous silicates, such as sodium metasilicate and amorphous disilicate. Examples of carbonate and hydrogencarbonate builders are those can be used in the form of their alkali metal, alkaline earth metal or ammonium salts. Preferred example of polyphosphate builder is pentasodium triphosphate. Organic builders include, for example, low molecular weight carboxylic acids, such as citric acid, hydrophobically modified citric acid, e.g. agaricic acid, malic acid, tartaric acid, gluconic acid, glutaric acid, succinic acid, imidodisuccinic acid, oxydisuccinic acid, propanetricarboxylic acid, butanetetra-carboxylic acid, cyclopentanetetracarboxylic acid, alkyl- and alkenylsuccinic acides and aminopolycarboxylic acids, e.g. nitrilotriacetic acid, •-alaninediacetic acid, ethylenediaminetetraacetic acid, serinediacetic acid, isoserinediacetic acid, N-(2-hydroxyethyl) iminoacetic acid, ethylenediaminedisuccinic acid and methyl- and ethylglycinediacetic acid or alkali metal salts thereof; oligomeric and polymeric carboxylic acids, such as homopolymers of acrylic acid and aspartic acid, oligomaleic acids, copolymers of maleic acid with acrylic acid, methacrylic acid or $C_2$-$C_{22}$-olefins, e.g. isobutene or long-chain •-olefins, vinyl $C_1$-$C_8$-alkyl ethers, vinyl acetate, vinyl propionate, (meth)acrylic acid esters of $C_1$-$C_8$-alcohols and styrene; phosphonic acids, such as, for example, 1-hydroxyethylene(1,1-diphosphonic acid), aminotri(methylenephosphonic acid), ethylenediaminetetra(methylenephosphonic acid) and diethylenetriaminepenta(methylenephosphonic acid) and alkali metal salts thereof.

The fabric care composition according to the present invention may further comprise customary auxiliaries or other materials which enhance the cleaning action, serve to treat or care for the textile material to be washed or change the performance properties of the fabric care formulation.

Examples of suitable auxiliaries include the substances given in U.S. Pat. No. 3,936,537, for example enzymes, in particular proteases, lipases, cellulases and amylases, mannanases; graying inhibitors, in particular carboxymethylcellulose and graft polymers of vinyl acetate onto polyethyleneglycol; bleaches, in particular adducts of hydrogen peroxide onto inorganic salts, such as sodium perborate-monohydrate, sodium perboratetetrahydrate and sodium carbonate perhydrate and percarboxylic acids such as phthalimidopercaproic acid; bleach activators, in particular N,N,N',N'-tetraacetylethylenediamine, sodium p-nonanoyloxybenzenesulfonate and N-methylmorpholinium acetonitrile methyl sulfate.

Other suitable auxiliaries are in particular, enzyme stabilizers, foam boosters, foam limiters, antitarnish and/or anticorrosion agents, suspension agents, dyes, fillers, optical brighteners, disinfectants, alkalis, hydrotropic compounds, antioxidants, perfumes, solvents, solubilizers, anti-redeposition agents, dispersants, processing auxiliaries, softeners, antistatic auxiliaries and soil release polymers.

The fabric care composition according to the present invention may further comprise dye transfer inhibitor. Examples of these dye transfer inhibitor are polyamine N-oxides, such as, for example, poly-(4-vinylpyridine N-oxide), copolymers of N-vinylpyrrolidone with N-vinylimidazole and optionally other monomers, homopolymers and copolymers of 4-vinylpyridine reacted with chloroacetic acid. A significant disadvantage of the dye transfer inhibitors is that they not only bind the dye detached from the textiles and present in the wash liquor, but additionally can also remove dyes from the textiles and thus promote fading of the washed colored fabric.

Detergent ingredients are otherwise generally known. Detailed descriptions can be found, for example, in Wo-A-99/06524 and 99/04313; in Liquid Detergents, Editor: Kuo-Yann Lai, Surfactant Sci. Ser., Vol. 67, Marcel Decker, New York, 1997, p. 272-304.

The present invention also relates to a method of preparing a fabric care composition having improved color care properties, which comprises a step of adding the hydrophobically modified polyalkyleneimine in the composition. Particularly, the present invention relates to a method for providing an improved color care effect during cleaning and/or treating colored fabrics, which comprises contacting the colored fabrics with a washing solution which contains the hydrophobically modified polyalkyleneimine. More particularly, the improved color care effect is due to color fixing effect.

Materials

Polyethyleneimine (Lupasol FG sold by BASF)

Palm kernel oil sold from Shanghai Jinyang Co., Ltd

EMPA 130: C.I. Direct Red 83.1 on cotton (Commercially available from Swissatest, Swissatest Testmaterialien AG, Switzerland)

EMPA 133: C.I. Direct Blue 71 on cotton (commercially available from Swissatest, Swissatest Testmaterialien AG, Switzerland)

Stained Fabrics:

JB 01: Mineral oil with carbon black on cotton, Chinese standard for detergency tests JB 03: Sebum with pigment on cotton, Chinese standard for detergency tests Test White Fabrics:

WFK 10A: Standard cotton (commercially available from wfk testgewebe GmbH, Germany);

WFK 20A: Polyester/cotton (65%/35%) (commercially available from wfk testgewebe GmbH, Germany)

WFK 80A: Knitted cotton (commercially available from wfk testgewebe GmbH, Germany)

WFK clay-oil: prepared using 20% WFK Clay (code 05203, commercially available from wfk testgewebe GmbH, Germany) with 1.25% mineral oil and 3.75% peanut oil in water.

Molecular Weight Determination

The weight-average molecular weight can be measured by gel permeation chromatography (GPC) using TSKgel $GMPW_{XL}$ columns, aqueous solution containing 1.8% acetic acid and 0.3 mol/L sodium acetate as eluent and polyethylene glycol salt as standards. Value outside this elution range are extrapolated.

EXAMPLES

Preparation of Inventive Hydrophobically Modified Polyethyleneimine (Unmodified Polyethyleneimine has a $M_w$=800 g/mol)

Polymer 1: 120 g of polyethyleneimine ($M_w$=800 g/mol) and 20.3 g of hexanoic acid were mixed and purged with nitrogen flow. The mixture was heated to 150° C. and stirred. The reaction was performed for 6 h and the product was obtained as a yellow liquid. The fraction of hydrocarbon radicals is 14.4% based on the weight of polyethyleneimine.

Polymer 2: 120 g of polyethyleneimine ($M_w$=800 g/mol) and 25.1 g of octanoic acid were mixed and purged with nitrogen flow. The mixture was heated to 150° C. and stirred. The reaction was performed for 6 h and the product was obtained as a yellow liquid. The fraction of hydrocarbon radicals is 18.5% based on the weight of polyethyleneimine.

Polymer 3: 60 g of polyethyleneimine ($M_w$=800 g/mol) and 17.5 g of lauric acid were mixed and purged with nitrogen flow. The mixture was heated to 150° C. and stirred. The reaction was performed for 6 h and the product was obtained as a yellow liquid. The fraction of hydrocarbon radicals is 26.6% based on the weight of polyethyleneimine.

Polymer 4: 900 g of polyethyleneimine ($M_w$=800 g/mol) and 297 g of palm kernel oil were mixed and purged with nitrogen flow. The mixture was heated to 90° C. and stirred. The reaction was performed for 6 h and the product was obtained as a yellow liquid. The fraction of hydrocarbon radicals is 28.7% based on the weight of polyethyleneimine.

Polymer 5: 90 g of polyethyleneimine ($M_w$=800 g/mol) and 29.9 g of myristic acid were mixed and purged with nitrogen flow. The mixture was heated to 150° C. and stirred. The reaction was performed for 6 h and the product was obtained as a yellow liquid. The fraction of hydrocarbon radicals is 30.7% based on the weight of polyethyleneimine.

Polymer 6: 90 g of polyethyleneimine ($M_w$=800 g/mol) and 33.5 g of palmitic acid were mixed and purged with nitrogen flow. The mixture was heated to 150° C. and stirred. The reaction was performed for 6 h and the product was obtained as a yellow paste. The fraction of hydrocarbon radicals is 34.8% based on the weight of polyethyleneimine.

Polymer 7: 80 g of polyethyleneimine ($M_w$=800 g/mol) and 33.1 g of stearic acid were mixed and purged with nitrogen flow. The mixture was heated to 150° C. and stirred. The reaction was performed for 6 h and the product was obtained as a yellowish paste. The fraction of hydrocarbon radicals is 38.9% based on the weight of polyethyleneimine.

Preparation of Comparative Hydrophobically Modified Polyethyleneimine (Unmodified Polyethyleneimine has a $M_w$ from 1300 to 5000 g/mol)

Comparative polymer 1 was obtained by the reaction of polyethyleneimine ($M_w$=2000 g/mol) and lauric acid under the condition described in U.S. Pat No. 2010/0017973. The fraction of hydrocarbon radicals is 25.6% based on the weight of polyethyleneimine.

Comparative polymer 2 was obtained by the reaction of polyethyleneimine ($M_w$=1300 g/mol) and lauric acid under the condition described in U.S. Pat No. 2010/0017973. The fraction of hydrocarbon radicals is 25.6% based on the weight of polyethyleneimine.

Comparative polymer 3 was obtained by the reaction of polyethyleneimine ($M_w$=5000 g/mol) and lauric acid under the condition described in U.S. Pat No. 2010/0017973. The fraction of hydrocarbon radicals is 28.0% based on the weight of polyethyleneimine.

Comparative polymer 4 was obtained by the reaction of polyethyleneimine ($M_w$=5000 g/mol) and palmitic acid under the condition described in U.S. Pat No. 2010/0017973. The fraction of hydrocarbon radicals is 36.5% based on the weight of polyethyleneimine.

Comparative polymer 5 was obtained by the reaction of polyethyleneimine ($M_w$=5000 g/mol) and palmitic acid under the condition described in U.S. Pat No. 2010/0017973. The fraction of hydrocarbon radicals is 115.8% based on the weight of polyethyleneimine.

Test of Color Fixing Performance

Selected colored fabrics (EMPA 130 and EMPA 133) were washed in the presence of white test fabric made of cotton using a liquid detergent composition (the detergent formulation was prepared at a pH between 7.0 to 9.0 and the composition is shown in Table 2) at 40° C. and 60° C. with the addition of the inventive dye fixative polymer. After the washing cycle, the fabrics were rinsed, spun and dried. In order to determine the color care effect, the fabrics were instrumentally assessed with a Datacolor reflection spectrometer Model Type ELREPHO before and after washing. From the reflection data reading L*, a*, b*, Y were derived and further expressed in ΔE and ΔY value.

For color fixing effect, ΔY is adopted for characterization, which is calculated from Y value for lightness according to CIE 1931 XYZ color space in accordance with following equation:

$$\Delta Y = Y_{washed} - Y_{initial}$$

For dye transfer inhibiting effect, ΔE is adopted as conventionally used in the art. ΔE is calculated as CIE 1976 color difference according to DIN EN ISO 11664-4 (June 2012) in accordance with following equation:

$$\Delta E = (\Delta L^{*2} + \Delta a^{*2} + \Delta b^{*2})^{1/2}$$

in which $$\Delta L^* = L^*_{washed} - L^*_{initial};$$

$$\Delta a^* = a^*_{washed} - a^*_{initial};\text{ and}$$

$$\Delta b^* = b^*_{washed} - b^*_{initial}$$

The values $L^*_{initial}$, $a^*_{initial}$, and $b^*_{initial}$ were measured on the test white fabric before washing. The values $L^*_{washed}$, $a^*_{washed}$, and $b^*_{washed}$ were measured on the test white fabric after washing. Standard colorimetric measurement was used to obtain L*, a*, and b* values.

The higher absolute values of ΔY are observed for the color bleeding fabrics in comparison to the initial lightness before the test, the higher color bleeding and lower color fixing is found.

The higher values of ΔE are observed for the test white fabric in comparison to the initial whiteness before the test, the higher dye transfer is found.

Any of the well-known methods of preparing detergent composition can be employed to make the detergent composition of this invention. The washing conditions are given in Table 1. The detergent composition used is given in Table 2. The test results for color fixing effect and dye inhibiting effect are listed in Table 3 & Table 4.

TABLE 1

| Washing conditions | |
|---|---|
| Machine | Launder-o-meter<br>12 containers |
| Detergent dosing | 3 g/L |
| Water hardness | 250 ppm |
| Fabric/liquor ratio | 1/20 |
| Wash temperature | 40° C., 60° C. |
| Wash time | 30 mins |
| Polymer dosing | 0.2% |
| Colored fabric | EMPA 130, EMPA 133 |
| Test fabric | WFK 10 A, WFK 20 A |

TABLE 2

Composition of liquid detergent

| Ingredients | [% by weight] |
|---|---|
| LAS | 6 |
| AEO | 24 |
| Sodium Citrate | 0.5 |
| Ethanol | 1.5 |
| Propylene glycol | 5.0 |
| Deionized water | Add to 100 |

LAS: Linear alkylbenzene sulfonate Disponil LDBS
AEO: C12/C14 fatty alcohol (7EO) Lutensol A7N

TABLE 3

Color fixing Test Results

| | EMPA 130 | | EMPA 133 | |
|---|---|---|---|---|
| No. | ΔY of color bleeding (at 40° C.) | ΔY of color bleeding (at 60° C.) | ΔY of color bleeding (at 40° C.) | ΔY of color bleeding (at 60° C.) |
| Blank | 0.30 | 0.31 | 0.03 | 0.30 |
| P1 | −0.10 | 0.15 | −0.05 | 0.16 |
| P2 | −0.07 | 0.24 | −0.03 | 0.13 |
| P3 | 0.09 | 0.24 | −0.01 | 0.18 |
| P4 | 0.19 | 0.18 | 0.04 | 0.21 |
| P5 | 0.07 | 0.18 | 0.03 | 0.04 |
| P6 | 0.36 | 0.15 | 0.00 | 0.21 |
| P7 | 0.24 | 0.20 | 0.06 | 0.14 |
| CP1 | 0.49 | 0.60 | 0.13 | 0.35 |
| CP2 | 0.61 | 0.55 | 0.06 | 0.30 |
| CP3 | 0.33 | 0.61 | 0.15 | 0.36 |
| CP4 | 0.38 | 0.75 | nd | nd |
| CP5 | nd | 0.86 | 0.15 | 0.33 |

Blank sample: the liquid detergent composition prepared without any dye fixative polymer.
P1-P7: Inventive Polymers 1-7
CP1-CP5: Comparative polymers 1-5
Nd: not determined As expressly demonstrated in Table 3, it has been found unexpectedly that the formulations comprising the inventive polymers show improved color fixing and lower color bleeding effect with lower absolute values of ΔY in comparison with the formulations comprising comparative polymers ($M_w$ higher than 1000 g/mol).

TABLE 4

| Dye transfer inhibiting test results | | | | | | | | |
|---|---|---|---|---|---|---|---|---|
| | EMPA 130 | | | | EMPA 133 | | | |
| No. | ΔE of WFK 10 (at 40° C.) | ΔE of WFK 20 (at 40° C.) | ΔE of WFK 10 (at 60° C.) | ΔE of WFK 20 (at 60° C.) | ΔE of WFK 10 (at 40° C.) | ΔE of WFK 20 (at 40° C.) | ΔE of WFK 10 (at 60° C.) | ΔE of WFK 20 (at 60° C.) |
| Blank | 4.48 | 3.13 | 25.77 | 21.17 | 20.33 | 16.06 | 31.8 | 25.84 |
| P1 | 2.46 | 2.23 | 11.63 | 9.78 | 6.76 | 4.44 | 24.77 | 20.05 |
| P2 | 2.46 | 1.98 | 12.31 | 9.52 | 6.55 | 3.97 | 26.40 | 21.41 |
| P3 | 2.34 | 1.82 | 11.59 | 8.74 | 8.50 | 5.80 | 28.38 | 22.04 |
| P4 | 2.33 | 1.64 | 11.81 | 9.06 | 9.97 | 6.88 | 26.97 | 19.91 |
| P5 | 2.40 | 2.02 | 12.07 | 9.09 | 7.77 | 5.24 | 28.35 | 21.33 |
| P6 | 2.67 | 2.27 | 11.92 | 8.92 | 10.12 | 6.94 | 29.36 | 23.23 |
| P7 | 2.92 | 2.25 | 11.22 | 8.85 | 9.09 | 6.12 | 28.65 | 22.69 |

Blank sample: the liquid detergent composition prepared without any dye fixative polymer.
P1-P7: Inventive Polymers 1-7

As demonstrated in Table 4, it has been found that the formulations comprising the inventive polymers make it possible to obtain good dye inhibiting effect with lower values of ΔE in comparison with the formulations without dye fixative polymer.

The liquid detergent formulations were prepared according to the composition of Table 2 by varying the concentration of the inventive polymer 4. The color fixing effect and dye inhibiting effect of the formulations were tested under the same washing condition listed in Table 2. The results are given in Table 5.

TABLE 5

| | EMPA 130 | | | EMPA 133 | | |
|---|---|---|---|---|---|---|
| Concentrations of Polymer 4 | ΔY of color bleeding | ΔE of WFK 10 | ΔE of WFK 20 | ΔY of color bleeding | ΔE of WFK 10 | ΔE of WFK 20 |
| Blank | 0.65 | 25.81 | 21.03 | 0.17 | 34.07 | 26.13 |
| 0.1 wt. % | 0.34 | 15.33 | 11.03 | 0.10 | 32.35 | 25.22 |
| 0.2 wt. % | 0.37 | 9.84 | 7.39 | 0.04 | 29.90 | 23.26 |
| 0.5 wt. % | 0.51 | 14.35 | 11.34 | −0.02 | 24.21 | 18.68 |

Blank sample: the liquid detergent composition prepared without any dye fixative polymer.

The results in Table 5 clearly show that all the formulations comprising the inventive polymer 4 with varying concentrations can bring about satisfactory color fixing and dye transfer inhibiting effects.

Formulation Compatibility Test 0.2% by weight of the inventive polymer 4 and comparative polymer 5 were added respectively in each aqueous surfactant solution or each formulation during the conventional formulation process. Each formulation comprises the overall surfactant concentration of 30% by weight but with different ratios of anionic/nonionic surfactants. Each sample with the polymer was kept for 1 week and its appearance was visually checked. The results are listed in Table 6.

TABLE 6

| Ingredient | Formulation A | | Formulation B | | Formulation C | |
|---|---|---|---|---|---|---|
| AEO | 9 wt. % | | 15 wt. % | | 6 wt. % | |
| AES | 13.5 wt. % | | 6 wt. % | | 12 wt. % | |
| LAS | 7.5 wt. % | | 9 wt. % | | 12 wt. % | |
| 1,2-propanediol | 5 wt. % | | 5 wt. % | | 5 wt. % | |
| Sodium Citrate | 1 wt. % | | 1 wt. % | | 1 wt. % | |
| Water | 63.8 wt % | | 63.8 wt. % | | 63.8 wt. % | |
| Polymer 4 | 0.2 wt. % | — | 0.2 wt. % | — | 0.2 wt. % | — |

TABLE 6-continued

| Ingredient | Formulation A | | Formulation B | | Formulation C | |
|---|---|---|---|---|---|---|
| Comparative polymer 5 | — | 0.2 wt. % | — | 0.2 wt. % | — | 0.2 wt. % |
| Stability & Optical appearance | Stable & Transparent | Unstable & turbid | Stable & Transparent | Unstable & turbid | Stable & Transparent | Unstable & turbid |

AEO: C12/C14 fatty alcohol (7EO) Lutensol A7N
AES: Alcohol Ethoxysulfate Texapon N 70
LAS: Linear alkylbenzene sulfonate Disponil LDBS The compatibility tests were performed with the formulations containing varied surfactants, particularly with the formulation A and formulation C which comprise anionic surfactants as dominant components in the surfactant blends.

As demonstrated in Table 6, it has been found unexpectedly that the formulations comprising the inventive polymer 4 of the present invention make it possible to obtain the stable and transparent solutions with improved compatibilities in comparison with the formulations comprising the comparative polymer 5 ($M_w$>1000 g/mol).

Detergency Test

The detergency test was also tested with the detergent formulations comprising the inventive polymers 3 and 4. The washing conditions are listed in Table 7. The detergent formulations were prepared according the compositions listed in Table 8.

Whiteness Test Method

The degree of whiteness of the test fabric was used to determine the degree of soiling. The difference of whiteness was determined by photometric measurement of the reflectance using an Elrepho 2000 photometer (Datacolor) at a wavelength of 457 nm.

The higher values of whiteness decrease are observed for the white test fabrics in comparison to the initial lightness before the test, the higher re-deposition of soil onto fabric is found.

The whiteness test results are given in Table 9.

TABLE 7

| Washing conditions | |
|---|---|
| Machine | Launder-o-meter 12 containers |
| Detergent dosing | 2 g/L |
| Water hardness | 250 ppm |
| Fabric/liquor ratio | 1/25 |
| Wash temperature | 30° C. |
| Wash time | 20 mins/3 cycles |
| Polymer dosing | 0.1%, 0.2%, 0.5% |
| Stain fabric | WFK clay-oil |
| White Test fabric | WFK 10 A, WFK 20 A |

TABLE 8

| Ingredients | Formulation D [% by weight] | Formulation E [% by weight] |
|---|---|---|
| LAS | 5 | 6 |
| AES | 10 | 0 |
| AEO | 5 | 24 |

TABLE 8-continued

| Ingredients | Formulation D [% by weight] | Formulation E [% by weight] |
|---|---|---|
| Sodium Citrate | 0.5 | 0.5 |
| Ethanol | 1.5 | 1.5 |
| Propylene glycol | 0 | 5.0 |
| Inventive polymer | 0.1/0.2/0.5 | |
| Deionized water | Add to 100 | |

AEO: C12/C14 fatty alcohol (7EO) Lutensol A7
AES: Alcohol Ethoxysulfate Texapon N 70
LAS: Linear alkylbenzene sulfonate Disponil LDBS

TABLE 9

| | Polymer amount % by weight | Whiteness decrease WFK 80A | Whiteness decrease WFK 10A |
|---|---|---|---|
| Formulation D comprising polymer 3 | 0 | 16.46 | 9.44 |
| | 0.1 | 13.98 | 7.85 |
| | 0.2 | 13.31 | 7.71 |
| | 0.5 | 13.20 | 7.47 |
| Formulation E comprising polymer 3 | 0 | 16.25 | 9.73 |
| | 0.1 | 16.14 | 9.59 |
| | 0.2 | 14.87 | 8.71 |
| | 0.5 | 14.41 | 8.46 |
| Formulation D comprising polymer 4 | 0 | 27.80 | 17.64 |
| | 0.1 | 25.89 | 17.61 |
| | 0.2 | 25.31 | 16.61 |
| | 0.5 | 24.93 | 14.64 |
| Formulation E comprising polymer 4 | 0 | 29.14 | 20.50 |
| | 0.1 | 28.66 | 19.80 |
| | 0.2 | 27.94 | 18.36 |
| | 0.5 | 24.96 | 17.18 |

According to the results shown in Table 9, it has been also found unexpectedly that, the hydrophobically modified polyalkyleneimine as dye fixative polymer in the detergent formulations, can prevent re-deposition of dirt which is removed from fabric by a laundry detergent from redepositing onto cleaned/washed fabric during the wash cycle. An especially favorably interaction between detersive surfactant and the inventive hydrophobically modified polyethyleneimine has been observed, giving reduced redeposition of soil such as clay and oil onto the fabrics.

The invention claimed is:

1. A fabric care composition comprising at least one hydrophobically modified polyalkyleneimine, wherein the hydrophobically modified polyalkyleneimine comprises a polyalkyleneimine backbone having weight-average molecular weight greater than or equal to 200 g/mol and less than 1000 g/mol; and hydrophobic moieties which are covalently attached to the polyalkyleneimine backbone; further comprising at least one nonionic, anionic, and/or cationic surfactant.

2. The fabric care composition according to claim 1, wherein from 2 to 25 mol % of nitrogen atoms of the polyalkyleneimine carry an aliphatic, saturated, or unsaturated hydrophobic moiety.

3. The fabric care composition according to claim 1, wherein a fraction of the hydrophobic moieties, based on a total weight of the hydrophobically modified polyalkyleneimine, constitutes 5 to 60% weight.

4. The fabric care composition according to claim 1, wherein the hydrophobic moieties are present in a form of $C_4$-$C_{30}$ alkyl, $C_4$-$C_{30}$ alkyl carbonyl, $C_4$-$C_{30}$ alkenyl, $C_4$-$C_{30}$ alkenyl carbonyl, $C_4$-$C_{30}$ alkadienyl, $C_4$-$C_{30}$ alkadienyl carbonyl, and/or hydroxy-$C_4$-$C_{30}$ alkyl groups.

5. The fabric care composition according to claim 1, wherein the hydrophobically modified polyalkyleneimine has a weight-average molecular weight in a range of from 300 to 5000 g/mol.

6. The fabric care composition according to claim 1, wherein the hydrophobically modified polyalkyleneimine is branched.

7. The fabric care composition according to claim 1, wherein the hydrophobically modified polyalkyleneimine is obtained by a process which comprises a reaction of an unmodified polyalkyleneimine with a hydrophobicizing agent.

8. The fabric care composition according to claim 7, wherein the hydrophobicizing agent is selected from the group consisting of linear or branched carboxylic acids having 4 to 30 carbon atoms, natural oils, linear or branched alkyl halides having 4 to 30 carbon atoms, alkyl epoxides having 4 to 30 carbon atoms, alkyl ketene dimers having 4 to 30 carbon atoms, cyclic dicarboxylic acid anhydrides having 4 to 30 carbon atoms, alkyl isocyanates having 4 to 30 carbon atoms, chloroformic acid esters of linear or branched alkanols or alkenols having 4 to 30 carbon atoms, and linear or branched aliphatic aldehydes having 4 to 30 carbon atoms.

9. The fabric care composition according to claim 1, wherein the polyalkyleneimine backbone is branched.

10. The fabric care composition according to claim 1, wherein the hydrophobically modified polyalkyleneimine is hydrophobically modified polyethyleneimine, hydrophobically modified polypropyleneimine, or hydrophobically modified polybutyleneimine.

11. The fabric care composition according to claim 1, wherein the hydrophobically modified polyalkyleneimine is in a concentration of from 0.01 to 30% by weight of the composition.

12. The fabric care composition according to claim 1, wherein the surfactant, based on a total weight of the composition, is from 0.5 to 80% by weight.

13. A method for providing an improved color care effect during washing and/or treatment of colored fabrics, the method comprising a step of contacting the colored fabric with a washing solution which contains the fabric care composition according to claim 1.

14. A method of using fabric care product comprising the fabric care composition according to claim 1, the method comprising using the fabric care composition for preparing wherein the fabric care product is selected from the group consisting of laundry detergents, fabric conditioners, pretreatment agents, tumble drier sheets, and after-washing sprays products.

15. The fabric care composition according to claim 1, wherein the weight-average molecular weight of the polyalkyleneimine backbone is greater than or equal to 300 g/mol and less than 1000 g/ mol.

16. The fabric care composition according to claim 1, wherein the weight-average molecular weight of the polyalkyleneimine backbone is greater than or equal to 500 g/mol and less than 1000 g/ mol.

17. The fabric care composition according to claim 1, wherein from 5 to 20 mol % of nitrogen atoms of the polyalkyleneimine carry an aliphatic, saturated, or unsaturated hydrophobic moiety.

18. The fabric care composition according to claim 1, wherein a fraction of hydrophobic moieties, based on a total weight of the hydrophobically modified polyalkyleneimine, constitutes 10 to 50% by weight.

* * * * *